United States Patent
Lee et al.

(10) Patent No.: US 11,436,825 B2
(45) Date of Patent: Sep. 6, 2022

(54) METHOD AND APPARATUS FOR DETERMINING TARGET OBJECT IN IMAGE BASED ON INTERACTIVE INPUT

(71) Applicant: Samsung Electronics Co., Ltd., Suwon-si (KR)

(72) Inventors: Hyong Euk Lee, Suwon-si (KR); Qiang Wang, Beijing (CN); Chao Zhang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 412 days.

(21) Appl. No.: 16/680,833

(22) Filed: Nov. 12, 2019

(65) Prior Publication Data

US 2020/0193160 A1    Jun. 18, 2020

(30) Foreign Application Priority Data

Dec. 14, 2018  (CN) .......................... 201811532287.7
Jul. 16, 2019  (KR) .......................... 10-2019-0085650

(51) Int. Cl.
  *G06K 9/00*   (2022.01)
  *G06V 20/20*  (2022.01)
  *G06F 16/28*  (2019.01)
  *G06F 40/40*  (2020.01)

(52) U.S. Cl.
  CPC ............ *G06V 20/20* (2022.01); *G06F 16/285* (2019.01); *G06F 40/40* (2020.01)

(58) Field of Classification Search
  CPC .... G06V 20/20; G06V 10/426; G06V 10/454; G06V 10/82; G06V 20/00; G06V 20/70; G06F 16/285; G06F 40/40; G06F 40/30; G06K 9/629

USPC .............................. 382/103, 180; 348/222.1
See application file for complete search history.

(56) References Cited

U.S. PATENT DOCUMENTS

| | | | |
|---|---|---|---|
| 9,286,291 B2 | 3/2016 | Bufe et al. | |
| 9,317,540 B2 | 4/2016 | Rouat et al. | |
| 9,792,534 B2 | 10/2017 | Wang et al. | |
| 9,928,448 B1 | 3/2018 | Merler et al. | |
| 10,860,847 B2 * | 12/2020 | Qian .................... | G06V 40/103 |
| 2015/0331929 A1 | 11/2015 | Ei-Saban et al. | |
| 2016/0328381 A1 | 11/2016 | Reiter | |

(Continued)

FOREIGN PATENT DOCUMENTS

| | | |
|---|---|---|
| JP | 2004-178343 A | 6/2004 |
| KR | 10-0752098 B1 | 8/2007 |
| KR | 10-2018-0073424 A | 7/2018 |

OTHER PUBLICATIONS

Mikolov, Tomas, et al., "Efficient Estimation of Word Representations in Vector Space", arXiv preprint arXiv:1301.3781, Sep. 7, 2013 (pp. 1-12).

(Continued)

*Primary Examiner* — Charlotte M Baker
(74) *Attorney, Agent, or Firm* — NSIP Law

(57) ABSTRACT

Provided are methods and apparatuses for determining a target object in an image based on an interactive input. A target object determining method acquires first feature information corresponding to an image and second feature information corresponding to an interactive input; and determines a target object corresponding to the interactive input from among objects in the image based on the first feature information and the second feature information.

25 Claims, 11 Drawing Sheets

(56) References Cited

U.S. PATENT DOCUMENTS

2018/0032874 A1    2/2018   Sánchez Charles et al.
2018/0036175 A1    2/2018   Rollend et al.
2018/0197049 A1    7/2018   Tran et al.
2018/0197072 A1    7/2018   Hausler et al.

OTHER PUBLICATIONS

Kim, Woo-ju, et al., "Semantic Extention Search for Documents Using the Word2vec", *The Journal of the Korea Contents Association*, vol. 16, Issue 10, 2016 (pp. 687-692).

Mao, Junhua, et al. "Generation and Comprehension of Unambiguous Object Descriptions", *Proceedings of the IEEE conference on computer vision and pattern recognition*, 2016 (10 pages in English).

Yu, Licheng, et al., "A Joint Speaker-Listener-Reinforcer Model for Referring Expressions", *Proceedings of the IEEE Conference on Computer Vision and Pattern Recognition*, 2017 (9 pages in English).

Luo, Ruotian, et al., "Comprehension-guided referring expressions", *Proceedings of the IEEE Conference on Computer Vision and Pattern Recognition*, 2017 (10 pages in English).

Li, Yikang, et al. "Scene Graph Generation from Objects, Phrases and Region Captions", *Proceedings of the IEEE International Conference on Computer Vision*, 2017 (pp. 1261-1270).

Yu, Licheng, et al. "Mattnet: Modular Attention Network for Referring Expression Comprehension", *Proceedings of the IEEE Conference on Computer Vision and Pattern Recognition* Mar. 27, 2018 (pp. 1-15).

\* cited by examiner

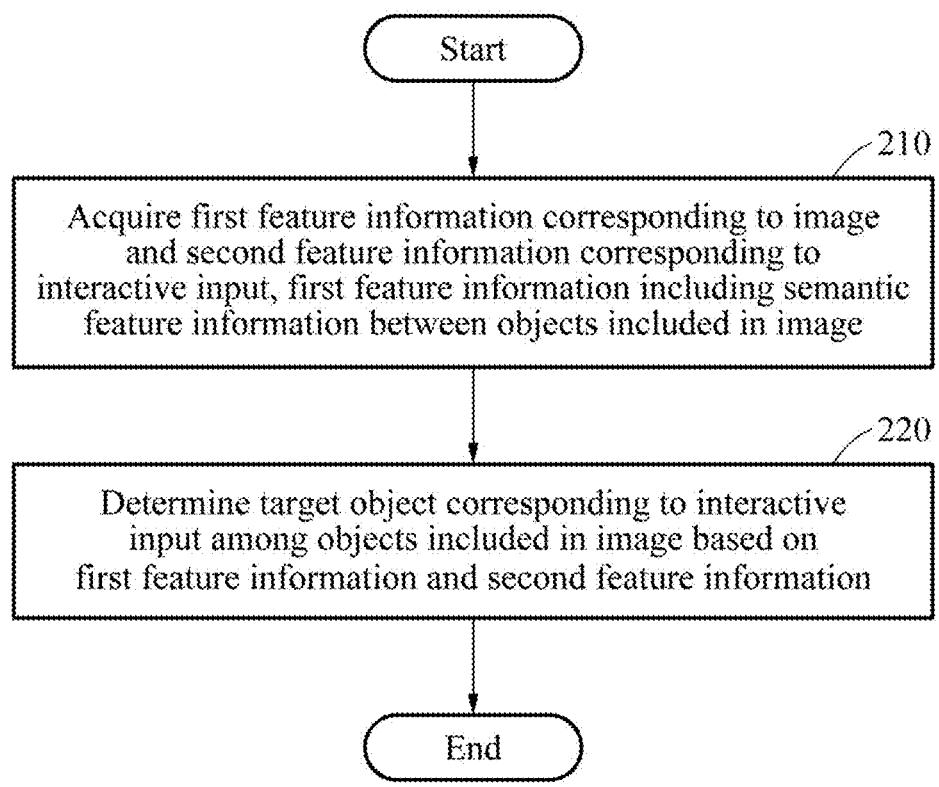

METHOD AND APPARATUS FOR DETERMINING TARGET OBJECT IN IMAGE BASED ON INTERACTIVE INPUT

CROSS-REFERENCE TO RELATED APPLICATIONS

This application claims the benefit under 35 USC § 119(a) of Chinese Patent Application No. 201811532287.7 filed on Dec. 14, 2018 in the State Intellectual Property Office of the People's Republic of China and Korean Patent Application No. 10-2019-0085650 filed on Jul. 16, 2019 in the Korean Intellectual Property Office, the entire disclosures of which are incorporated herein by reference for all purposes.

BACKGROUND

Field

The following description relates to a human-machine interactive technology, and more particularly, to a method and apparatus for determining a target object in an image based on an interactive input.

2. Description of Related Art

Determining a target object based on an interactive input is being researched in the field of human-machine interactive technology. Object detection technology widely applies to a computer vision field.

The target object detection relates detecting a specific type of an object in an image or a video of a computer vision field, for example, a single frame of movie. To accomplish this, a bounding box of each of objects included in an image may be provided and a corresponding object type tag may be provided with respect to the input image.

In a human-machine interactive technology, a computer may understand an interactive input of a user. For example, in response to voice input from the user, the computer converts a voice instruction output from the user to a text using a voice recognition technology to easily understand an instruction of the user. The computer extracts a noun from the instruction of the user using a natural language processing technique, for example, analysis of a method of speaking. Using the human-machine interactive technology that determines a target object in response to an interactive input of the user, Thus, the computer understands what is designated by the user, i.e., it determines a target object that is designated by the user, at a desired level, and determines an object designated by the user in a given image or a video, for example, a single frame of the video.

FIGS. 1A, 1B, and 1C illustrate examples of determining a target object in an image according to the related art.

Referring to FIG. 1A, only a single airplane is present in an image. If a user says an airplane, a computer understands an object designated by the user and provides a bounding box 110 corresponding to the object as shown in FIG. 1B.

Such human-machine interactive technology faces difficulty when more than one object belonging to the same type as the object designated by the user is present in a scene, and cannot exactly identify the object designated by the user using a simple target detection technology alone. For example, if the user says "a person riding a motorcycle" and many people are present in a scene, the computer cannot determine a person designated by the user using object detection technology. Accordingly, an accurate result is not acquired.

Referring to FIG. 1C, one of methods according to the related art determines a target object by simultaneously providing a plurality of objects 111, 112, and 113 detected in response to an interactive input such that the user may select a single object from among the objects 111, 112, and 113. However, this method requires a separate confirmative selection operation from the user and the interactive efficiency is degraded accordingly. Further, if a relatively large number of objects are present in a scene, for example, a group photo that includes many people, tags are densely concentrated and the user cannot easily select a desired object.

Another method according to the related art considers this type of issue as a fine-grained object detection and handles object attribute information using a separate tag, for example, a short man, a person with glasses, and a red vehicle, when training a detection model. Accordingly, a large number of annotations are required to train the detection model. Also, the accuracy of detecting an object of a type absent in a training set significantly drops in actual use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of determining a target object in an image based on an interactive input, the method including acquiring first feature information corresponding to an image and second feature information corresponding to an interactive input, and determining a target object corresponding to the interactive input from among objects in the image based on the first feature information and the second feature information.

The acquiring of the first feature information and the second feature information may include acquiring semantic feature information between each of the objects included in the image and at least one another object included in the image.

The acquiring of the semantic feature information may include acquiring the semantic feature information between each of the objects included in the image and the at least one another object included in the image based on position information of each of the objects.

The acquiring of the semantic feature information may include determining at least one region proposal based on each of the objects included in the image and the at least one another object included in the image, acquiring classification feature information of an object in the region proposal, acquiring region semantic feature information between objects in the region proposal, and generating the semantic feature information between each of the objects included in the image and the at least one another object included in the image based on the classification feature information and the region semantic feature information.

Prior to the generating of the semantic feature information, the method may include performing a joint correction with respect to the classification feature information and the region semantic feature information based on the classification feature information and the region semantic feature information.

Prior to the generating of the semantic feature information, the method may include determining a reference region based on the region proposal, acquiring region feature information of the reference region, and performing a joint correction with respect to the classification feature information, the region semantic feature information, and the region feature information based on the classification feature information, the region semantic feature information, and the region feature information.

The region proposal may include one of the objects included in the image and one of the at least one another object included in the image.

The first feature information may include at least one of global visual feature information corresponding to the image, visual feature information corresponding to each of the objects included in the image, relative position information between the objects included in the image, relative size feature information between the objects included in the image, and semantic feature information between the objects included in the image.

The determining of the target object may include performing a fusion processing on the first feature information prior to determining the target object.

The method may include acquiring training data including a sample image, determining at least one region proposal based on each of objects included in the sample image and at least one another object included in the sample image, determining a reference region based on the at least one region proposal and acquiring region feature information of the reference region, generating a region title based on the region feature information, and training a neural network model for acquiring semantic feature information between the objects included in the image based on training data supervised with the region title.

The acquiring of the first feature information and the second feature information may include performing a word vector conversion with respect to the interactive input, and acquiring the second feature information corresponding to the interactive input based on a word vector.

The acquiring of the first feature information and the second feature information further may include determining whether a word of the interactive input belongs to a first word prior to performing the word vector conversion with respect to the interactive input, and the performing of the word vector conversion may include using a word vector of a second word having a relatively high similarity with a word vector of the first word as a word vector corresponding to the first word, in response to the word of the interactive input being determined to belong to the first word.

The first word represents a word having a use frequency less than a first setting value, and the second word represents a word having a use frequency greater than a second setting value.

The interactive input may include at least one of a voice input or a text input.

In another general aspect, there is provided an apparatus for determining a target object in an image based on an interactive input, the apparatus including a feature acquirer configured to acquire first feature information corresponding to an image and second feature information corresponding to an interactive input, and a target object determiner configured to determine a target object corresponding to the interactive input from among objects included in the image based on the first feature information and the second feature information.

The first feature information may include at least one of global visual feature information corresponding to the image, visual feature information corresponding to each of the objects included in the image, relative position information between the objects included in the image, relative size feature information between the objects included in the image, or semantic feature information between the objects included in the image.

The feature acquirer may be configured to determine at least one region proposal based on each of the objects included in the image and at least one another object included in the image, acquire classification feature information of an object in the region proposal, acquire region semantic feature information between objects in the region proposal, determine a reference region based on the region proposal, acquire region feature information of the reference region, perform a joint correction with respect to the classification feature information, the region semantic feature information, and the region feature information based on the classification feature information, the region semantic feature information, and the region feature information, and generate the semantic feature information between each of the objects included in the image and the at least one another object included in the image based on the corrected classification feature information, the corrected region semantic feature information, and the corrected region feature information.

The feature acquirer may be configured to perform a word vector conversion with respect to the interactive input, and acquire the second feature information corresponding to the interactive input based on a word vector.

The feature acquirer is further configured to determine whether a word of the interactive input belongs to a first word when performing the word vector conversion with respect to the interactive input, and use a word vector of a second word having a relatively high similarity with a word vector of the first word as a word vector corresponding to the first word, in response to the word of the interactive input being determined to belong to the first word, wherein the first word represents a word having a use frequency less than a first setting value, and the second word represents a word having a use frequency greater than a second setting value.

Other features and aspects will be apparent from the following detailed description, the drawings, and the claims.

BRIEF DESCRIPTION OF THE DRAWINGS

FIG. 2 is a diagram illustrating an example of a method of determining a target object in an image based on an interactive input.

Figure 1A:
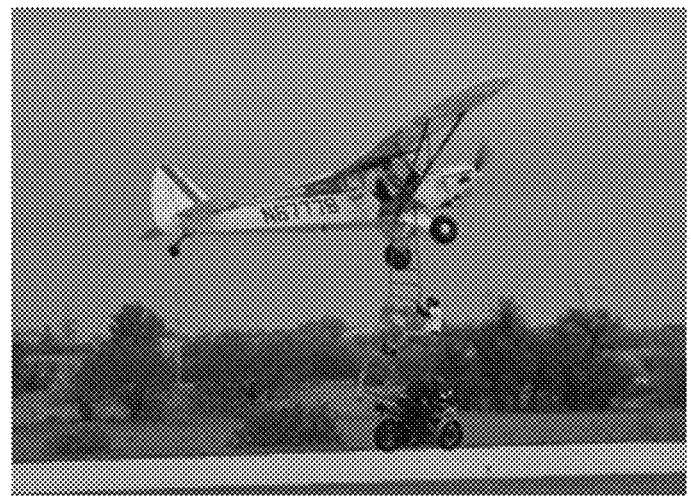
FIGS. 1A to 1C illustrate examples of determining a target object in an image according to the related art.
Figure 1B:
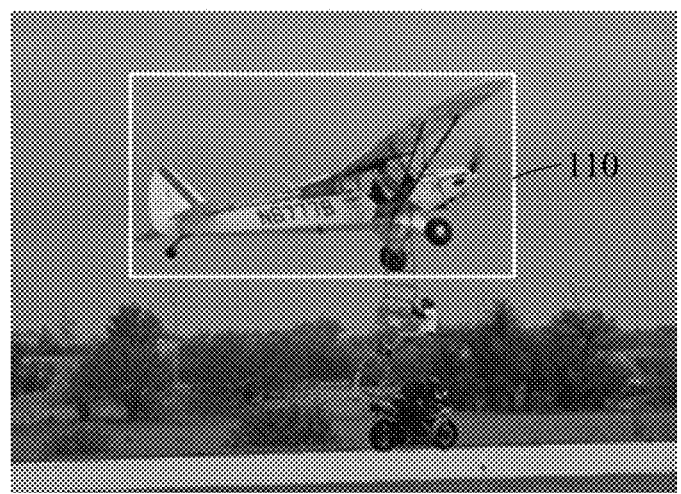
Figure 1C:
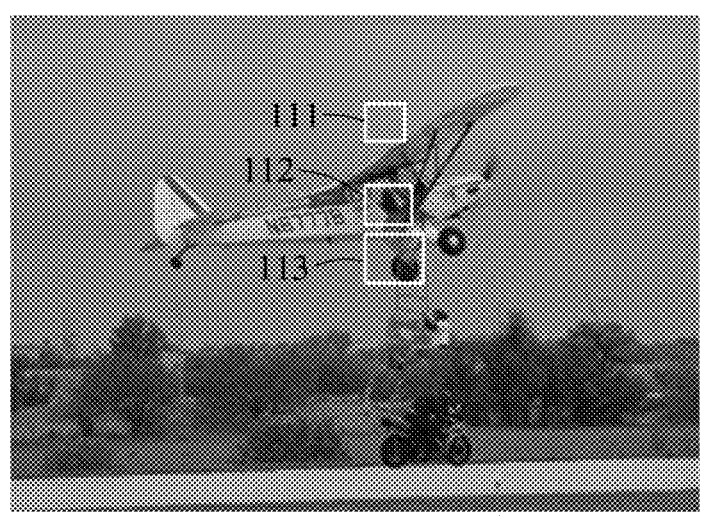

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

In one example, a method of determining a target object in an image based on an interactive input includes acquiring feature information and determining a target object. In an example, first feature information corresponding to an image and second feature information corresponding to an interactive input are acquired and the target object corresponding to the interactive input is determined from among objects included in the image based on the first feature information and the second feature information.

The first feature information includes at least one of visual feature information (also referred to global visual feature information) of a full image corresponding to an image, visual feature information (also referred to as visual feature information of a unit object) corresponding to each of the objects included in the image, relative position information and/or relative size feature information between each of the objects included in the image, and at least one another object adjacent to a corresponding object, and semantic feature information between the objects included in the image.

Being adjacent to an object is defined based on position information of each of the object included in the image. For example, if a distance between an object and another object is less than a distance, the object and the other object may be adjacent to each other.

In an example, acquiring the first feature information corresponding to the image may include acquiring each of visual feature information of the full image, visual feature information of the unit object, relative position information and relative size feature information between each of the objects included in the image and at least one another object adjacent to a corresponding object, and semantic feature information between the objects included in the image, and subsequently acquiring the first feature information corresponding to the image by performing a fusion processing on each piece of information.

FIG. 2 illustrates an example of a method of determining a target object in an image based on an interactive input when first feature information includes semantic feature information between objects included in the image. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions.

FIG. 2 is a diagram illustrating an example of a method of determining a target object in an image based on an interactive input.

Referring to FIG. 2, in operation 210, first feature information corresponding to an image and second feature information corresponding to an interactive input are acquired. In an example, the first feature information may include semantic feature information between objects included in the image.

In operation 220, a target object corresponding to the interactive input is determined from among the objects included in the image based on the first feature information and the second feature information.

In an example, when the first feature information includes the semantic feature information between the objects of the image and the first feature information corresponding to the image is acquired, operation 210 may include acquiring semantic feature information between each of the objects included in the image and at least one another object adjacent to a corresponding object.

In an example, an operation of acquiring the semantic feature information included in the first feature information determines at least one region proposal based on each of the objects included in the image and the at least one another object adjacent thereto, acquires classification feature information of an object in the region proposal and region semantic feature information between objects in the region proposal, and generates the semantic feature information between each of the objects included in the image and the at least one another object adjacent thereto based on the classification feature information and the region semantic feature information.

In an example, to clarify the acquired semantic feature information between each of the objects included in the image and the at least one another object adjacent thereto, a joint correction may be performed with respect to the classification feature information and the region semantic feature information based on the acquired classification feature information and the acquired region language feature information, prior to generating the semantic feature information. Here, the joint correction represents correcting corresponding feature information based on related feature information of a different type.

In an example, prior to acquiring the semantic feature information between each of the objects included in the image and the at least one another object included in the image, a reference region including a corresponding region proposal may be determined and region feature information of the reference region may be acquired. A joint correction may be performed with respect to the classification feature information, the region semantic feature information, and the region feature information based on the classification feature information, the region semantic feature information, and the region feature information.

In an example, when training a neural network model using semantic feature information between each of the objects included in the image and the at least one another object included in the image, a region title may be acquired using the reference region and supervised training may be performed with respect to a model using the region title, which may lead to enhancing the quality of the model.

In an example, visual feature information of a full image corresponding to an image, visual feature information of a unit object, and relative position information and relative size feature information between each of objects included in the image and another object adjacent to a corresponding object are extracted using a basic network. Semantic feature information is extracted using, for example, a pairwise visual relationship network (VRN). The VRN may be acquired through a specific mechanism and training based on a convolutional neural network of a basic network, for example, VGG-NET. The VRN is merely used to classify another basic network and is not construed to limit the corresponding example.

In an example, a method of determining a target object in an image may determine a specific object, for example, a human, an animal, and a thing, corresponding to an interactive input, for example, a natural language input or a language input, may be determined in an image or a scene. Also, the method of determining a target object in an image may enhance the interactive capability of a human-machine interactive device such that a specific object represented using a semantic feature, such as an attribute, a position, and a motion associated with the interactive input, may be determined, although a plurality of objects belonging to the same type is present in the image or the scene. Hereinafter, an example of the method of determining a target object in an image based on an interactive input is further described based on the human-machine interactive device of a natural language input or voice input.

Figure 3:
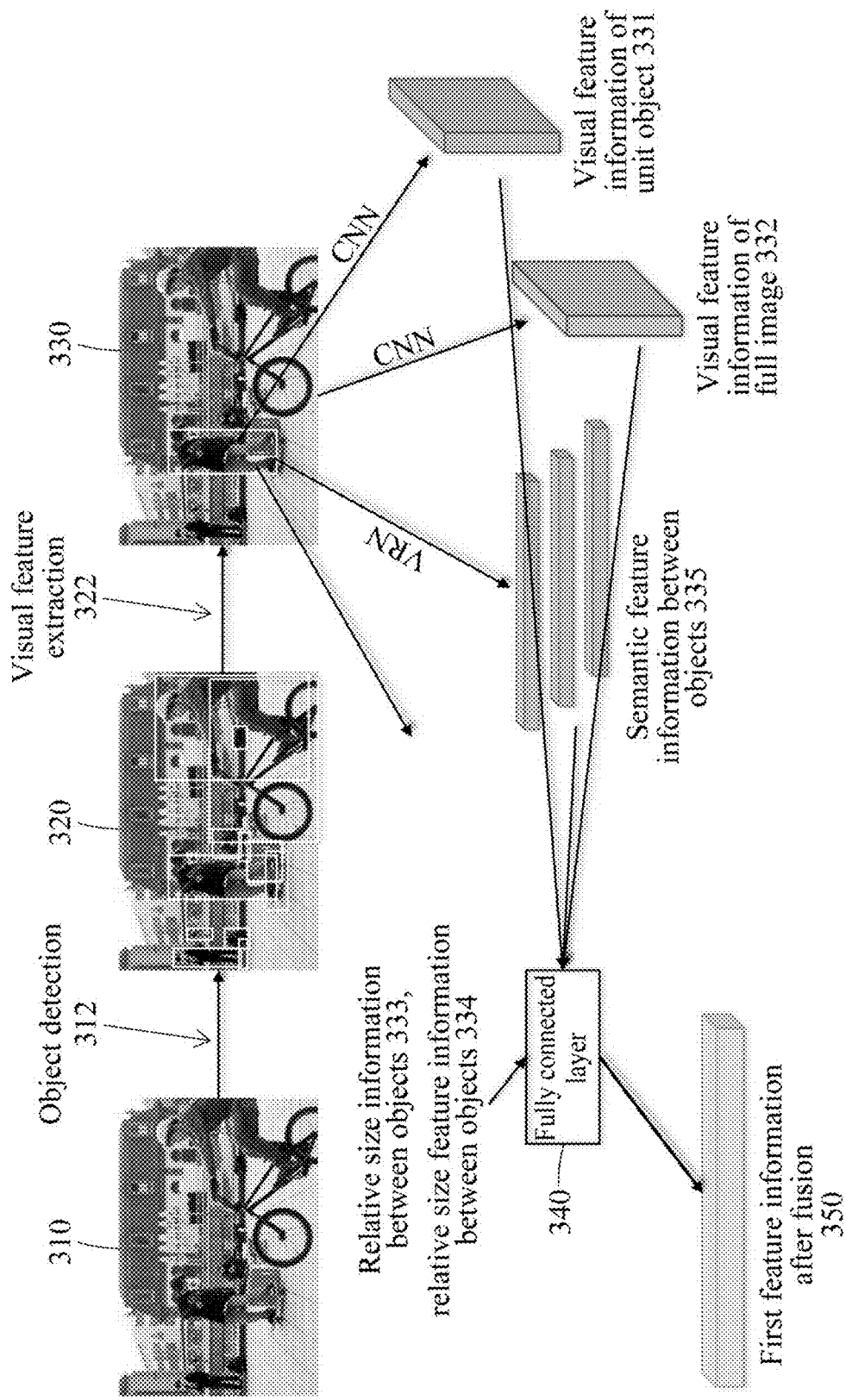
FIG. 3 illustrates an example of a process of determining a target object in an image based on an interactive input.

FIG. 3 illustrates an example of a process of determining a target object in an image based on an interactive input.

Referring to FIG. 3, an object detection 312 is performed with respect to an object included in an input image 310 or a single frame of a video. The object detection 312 may be used to detect all of the objects included in the image 310 and may provide a bounding box of each of the objects. In an example, the bounding box may include position information and size information.

In an example, the object detection 312 may be performed using a faster R-CNN. However, it is provided as an example only and the object detection 312 may be performed using another network. In an example, the faster R-CNN is a neural network that detects an object in an image and classifies a class of the object.

In an example, a visual feature extraction 322 is performed with respect to a region of a corresponding object using a basic network with respect to each detected object included in an image 320. Also, the same visual feature extraction 322 is performed with respect to other adjacent object regions and a full image. Through the visual feature extraction 322, an image 330 in which a visual feature is extracted includes visual feature information 331 of a unit object, i.e. each object, visual feature information 332 of a full image, and relative position information 333 and/or size feature information 334 between objects included in the image 330.

Here, the visual feature information 332 of the full image refers to a visual feature of the full image, such as, for example, a park and a day, in the input image 310.

The visual feature information 331 of the unit object refers to a visual feature of each of the objects included in the image, such as, for example, a bicycle, a person, a skateboard, a hat, and a box in the input image 310. In an example, a color and a position of each object may be included in the visual feature information 331.

Semantic feature information 335 between the objects represents a meaningful relationship between an object and another object adjacent thereto. For example, in the input image 310, "riding state" corresponding to a relationship between a bicycle and a person included in a person riding a bicycle may be the semantic feature information. That is, the semantic feature information represents a relationship used to concatenate one object with another object.

In the above example, an object region and visual feature information of the full image are extracted using a last layer of a convolutional layer of a third group and a fourth group using the faster R-CNN. As described above, feature extraction may be performed using another layer of another network, such as, for example, VGG-16 and ResNet-101. However, it is provided as an example only.

Figure 4:
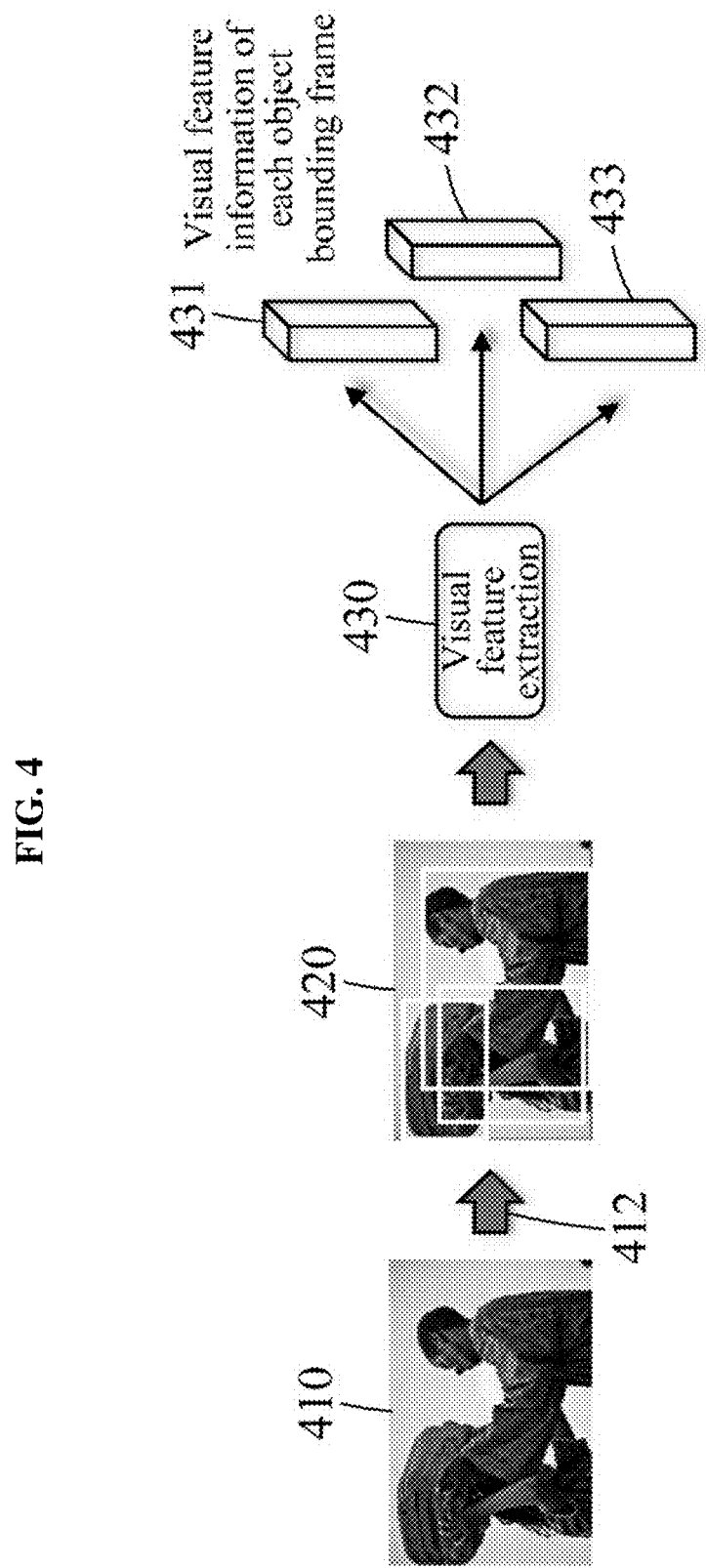
FIG. 4 illustrates an example of a process of acquiring visual feature information of an object.

FIG. 4 illustrates an example of a process of acquiring visual feature information of an object.

Referring to FIG. 4, as described above, an object detection 412 is performed with respect to an input image 410 and a bonding box of each of objects included in an image 420 in which the objects are detected is acquired. Visual feature information 431, 432, and 433 is acquired through a visual feature extraction 430 on a current bonding box corresponding to a region of a current object, an adjacent bounding box corresponding to a region of another object adjacent to the object, and a full image using a specific layer of a basic network, such as, for example, VGG-16 and ResNet-101. At the same time, relative position information and relative size feature information between the current bounding box and the adjacent bounding box are connected to visual feature information as separate features. Visual feature information corresponding to each of the objects (each bounding box) included in the image is acquired by sequentially performing the aforementioned visual feature information extraction with respect to each of the objects included in the image.

In the example, with respect to a bounding box (and/or a bounding box of a unit object) of each of a current object and an object adjacent thereto, a normalization value (x/W, y/H) of left upper end coordinates, a normalization value (w/W, h/H) of a width and a height, and a normalization value (w*h/W*H) of an area may be used as a portion of visual feature information. In an example, with respect to the bounding box (and/or the bounding box of the unit object) of each of the current object and the adjacent object, the width w and the height h of the bounding box are divided by the width W and the height H of the full image. The area of the bounding box is divided by the area of the full image. In this manner, a fifth-dimensional (5D) feature vector is acquired.

Position information and size information of an object and relative position information and relative size information between the object and another object adjacent thereto acquired using the aforementioned method may include a left side/right side/top side/bottom side in a description of a current input word. In another example, when including a description, such as largest/smallest/highest/lowest, a target object described by a language may be determined.

Additionally, at least one pair of objects are generated by selecting at least one object adjacent to a current object from among objects present around the current object. In detail, a single pair of objects are generated by selecting an object adjacent to a detected object. Here, the definition of "adjacent" is described above. In general, a single pair of objects are generated by selecting a desired number of objects closest to the detected object based on a positional relationship between the objects. Some interactive relationships, for example, transport, arrangement, view, wearing, riding, leaning, and the like, are present among the adjacent objects. In an example, a number of selected adjacent objects may not exceed a desired number, for example, 5.

A VRN is identified based on a visual relationship between the generated pair of objects and semantic feature information between a single pair of objects, that is, between the objects is extracted.

Figure 5:
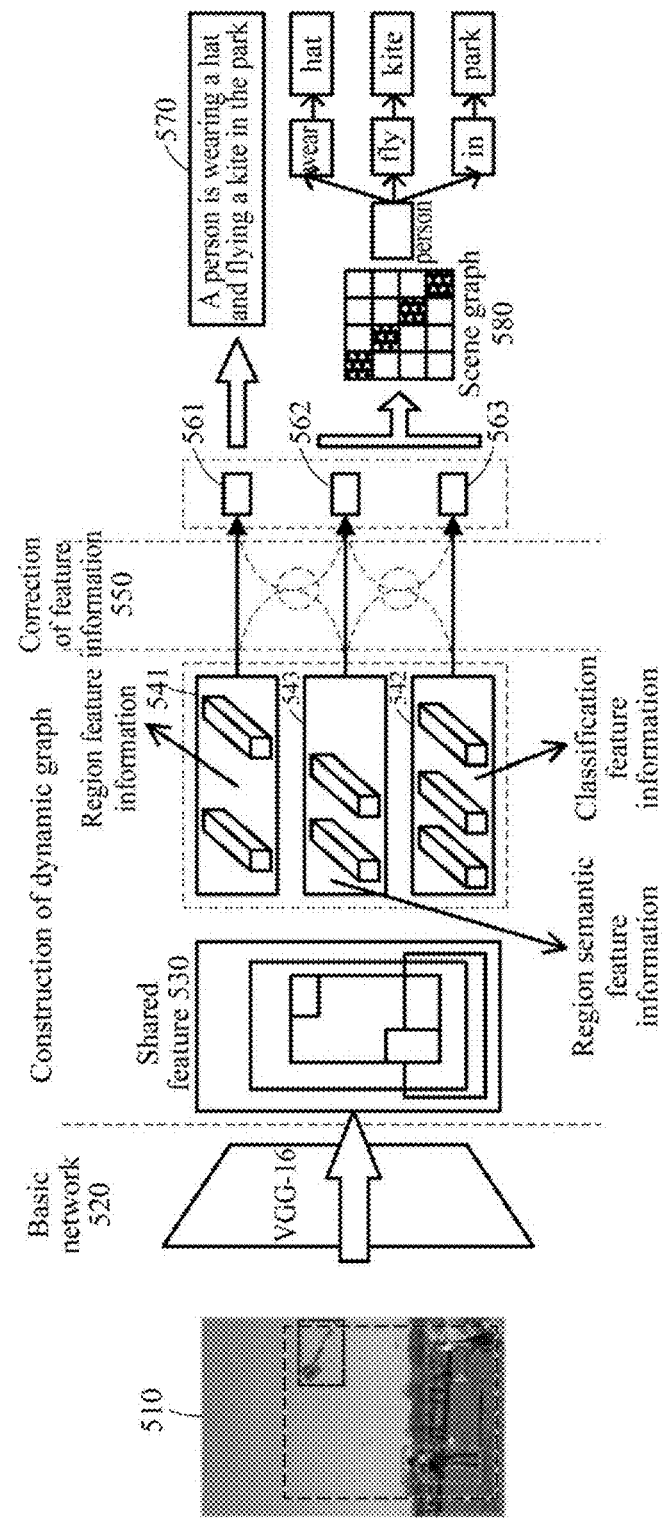
FIG. 5 illustrates an example of a process of acquiring semantic feature information between objects.

FIG. 5 illustrates an example of a process of acquiring semantic feature information between objects.

Referring to FIG. 5, a VGG-Net convolutional network is used as a basic network 520 of a VRN. A shared feature 530 of an image is acquired by performing a feature extraction with respect to an input image 510 using VGG-Net, for example, VGG-16. A single pair of objects are selected from an object detection result and a region proposal is generated based on the selected single pair of objects. In an example, each region proposal includes a single pair of objects, that is, a single current object and at least one another object adjacent thereto. In an example, a combination relationship between objects is acquired. Three different computer visual tasks are processed through three parallel branches 541, 542, and 543. In detail, a feature extraction is performed by dividing two object bounding boxes of a region proposal and a bounding box corresponding to the region proposal into the three branches 541, 542, and 543 based on the acquired shared feature.

In an example, a relatively large bounding box (corresponding to a reference region) compared to a bounding box corresponding to a region proposal is selected and a region feature information extraction is performed with respect to the selected bounding box, which is intended to generate a region title.

In an example, an extraction for classifying feature information is performed with respect to a bounding box of each of two objects, which is intended to perform an object classification.

In an example, an object region semantic feature information extraction is performed with respect to a bounding box corresponding to a region proposal, which is intended to identify a semantic feature between objects, for example, a relationship between objects, such as a motion relationship.

Referring to FIG. 5, prior to generating semantic feature information between each object and another object adjacent thereto based on classification feature information, region feature information, and zone feature information, a dynamic graph is generated based on classification feature information, region semantic feature information, and region feature information, and a feature information correction (also, referred to as a joint correction) 550 is performed based on classification feature information, region semantic feature information, and region feature information.

The dynamic graphic concatenates different inspiration regions (different bounding boxes) of different branches into a single region through semantic and spatial custom, and changes content through a correction process. Further accurate semantic feature information is acquired by performing the joint correction with respect to different branch features through passing message between different branches and by interconnecting features between branches.

Here, region feature information corresponds to feature information of a reference region including a region proposal. A correction may be performed with respect to classification feature information and region semantic feature information based on the region feature information. Here, the output accuracy of a neural network model may be considered. Once the correction is completed, an object classification is performed based on the corrected feature classification information, semantic feature information between objects is identified, and a region title 570 is generated.

In detail, the region title 570 is generated based on corrected feature information of a branch 1 561 through a long short-term memory (LSTM) included in the basic network 520. That is, the region title 570 describes "a person is wearing a hat and flying a kite in the park" with respect to a region of the image.

Here, the region title 570 may not be generated with respect to an easily understandable image region. A scene graph 580 is generated based on corrected feature information of a branch 2 562 and a branch 3 563. The scene graph 580 may be understood as a single matrix with a size of N×N. Here, N denotes a number of objects detected in an image. Each row and each column of the matrix correspond to a single object and each element of the matrix corresponds to semantic feature information between objects.

Referring to FIG. 5, each term of a scene matrix corresponds to a single object. For example, a first row of the scene graph 580 corresponds to an object "person". Each column of the matrix corresponds to a single object. For example, a first column corresponds to an object "hat", a second column corresponds to an object "kite", and a third column corresponds to an object "park".

A position at which a row and a column of the scene graph 580 intersect, that is, a position of each element of the matrix corresponds to semantic feature information between objects. For example, a position at which the first row and the first column intersect corresponds to semantic feature information between the object "person" and the object "hat". A corresponding element is "wear" and represents semantic feature information "a person is wearing a hat" between the object "person" and the object "hat". Likewise, an element corresponding to a position at which the first row and the second column intersect is "fly" and represents semantic feature information "a person is flying a kite". An element corresponding to a position at which the first row and the third column intersect is "in" and represents semantic feature information "a person is in the park" between the object "person" and the object "park". That is, the generated scene image may clearly represent semantic feature information among the objects included in the image.

In addition, in an online test process of a VRN, prior to generating the scene graph 580 based on the corrected feature information of the branch 2 562 and the branch 3 563, that is, prior to generating the scene graph 580 using the VRN (i.e., prior to generating semantic feature information between each of the objects included in the image and at least one another object included in the image based on classification feature information, region semantic feature information, and region feature information), an output result of a last fully connected layer is extracted and used to describe semantic feature information between two objects. Likewise, an output result of different layers of a corresponding network may be used to describe semantic feature information based on a demand and a test result.

In one example, there is provided a training method of a VRN that acquires a region title using a reference region title and performs a supervised training on a model using the region title. The training method acquires training data of an image including a sample image and determines at least one region proposal based on each of objects included in the sample image and at least one another object included in the sample image. The training method determines a reference region based on the region proposal, acquires region feature information of the reference region, and generates a region title based on the region feature information. When training a neural network model, training is performed using data with a region title as supervised training data in addition to performing supervised training with respect to classification feature information and region semantic feature information of a branch 1 and a branch 2. A relatively excellent object classification and relationship identification network may be acquired by assisting a network weight update of the branch 1 and the branch 2 during a reverse distribution process. Accordingly, during a test operation, relatively excellent classification and feature information may be extracted.

Referring again to FIG. 3, the method of determining a target object acquires first feature information 350 by sequentially acquiring at least one of the visual feature information 331, the visual feature information 332, the relative position information 333, the relative size feature information 334, and the semantic feature information 335 and then performing a fusion processing on the acquired information.

In one example, the fusion processing may perform a dimensionality reduction through a fully connected layer 340 that is fully connected by concatenating each piece of input information and may be implemented by perform the dimensionality reduction through the fully connected layer 340 and then performing re-concatenation. The dimensionality reduction may be performed by initially performing processing on a portion of the information and then concatenating different information. In an example, a different fusion processing method may be used based on design requirements and actual demand.

In an example, the dimensionality reduction indicates concatenating adjacent objects among many objects and extracting the same as a semantic visual feature. For example, in the case of generating first feature information "a person riding a bicycle" by concatenating visual feature information of unit objects, "bicycle" and "person", and semantic feature information "riding state", the bicycle, the person, and the riding state are concatenated to a single piece of information, which is referred to as the dimensionality reduction.

Processing using an input language acquires a language feature, that is, second feature information by converting the input language to a text using a voice identification tool and by encoding the entire sentence using an LSTM.

A process of performing matching, for example, visual language matching, with respect to first feature information and second feature information includes mapping each of the acquired first feature information and second feature information to a preset feature space, i.e., an embedding space. In the case of mapping first feature information, for example, mapping first feature information of each object, that is, each bounding box through a fully connected layer, first feature information corresponding to each bounding box is acquired in a new feature space. Here, first feature information and second feature information of a single bounding box includes a single pair of features and a feature set including first feature information and second feature information of a bounding box corresponding to an object designated by a user language, that is, a target object is a single pair of correlated language-visual features. The single pair of correlated language-visual features have a relatively great similarity in a mapping space compared to a single pair of uncorrelated language-visual features. Therefore, a single object having a highest similarity or a single pair of objects having a similarity within a desired range may be determined as a result of the target object corresponding to voice of the user based on the similarity level.

Based on a similarity between first feature information of each object (each bounding box) and second feature information of an input language, a single object having a highest similarity (i.e., a bounding box having a highest score) or a single group of objects (i.e., a plurality of bounding boxes having relatively high scores) having a similarity within a desired range may be output as a final result.

In one example, an object having a relatively high similarity may be selected based on a demand and be output for a user selection.

A visual feature of a bounding box or a full image may be extracted based on visual feature extraction of an object of the image and position and/or size information of each object may be extracted. Such a type of a feature includes only an actual position and/or a size between objects and does not include relatively high-level semantic information, such as a relationship between images. For example, the type of the feature may process a highest room and a second plate from the left. When an image includes two persons; one person holding a single box and one person sitting on a box; a person riding a bicycle and a person being hit by a bicycle; or a person wearing a hat and a person holding a hat, if high level semantic information between objects is not understandable in response to a user input "a person sitting on a box or a person stepping on a box", the device may accurately determine a person designated by the user.

Depending on examples, an image feature relatively corresponding to relatively high-level language information may be acquired. For example, a motion or a relationship between different objects, riding, holding, facing, and kicking, may be acquired. In one example, a relationship between objects may be understood. For example, person-ride-vehicle, person-hit-vehicle, person-get off-vehicle. Visual information and language information may be further well matched by identifying the relationship between objects.

In one example, disclosed is a device to mutually fuse visual feature information of an object and language feature information between objects, which may outperform an issue that an object designated by a user is undistinguishable based on position and size information in the related art, and may enhance the interactive performance of a human-machine interactive device.

In one example, when distinguishing objects based on language feature information between two objects, for example, a relationship between objects, it is possible to further accurately determine a target object.

An existing human-machine interactive device may face the following issues. If an interactive input is a voice input, representations of different users for the same object may not perfectly match. For example, if an image includes a plurality of plates and pineapple is placed on a single plate, many users may call the pineapple placed on the plate as pineapple. However, here, a new single user may call the pineapple with a different language habit. If the new user asks the device for "plate on which pineapple is placed", the device may not understand an object designated by "pineapple".

In an actual application of the human-machine interactive device, different persons have different language habits. Therefore, different words are likely to appear. An LSTM model may not learn a relatively excellent feature representation for a rare word and may not understand a sentence spoken by the user.

The following example proposes a solution for the above issue.

Figure 6:
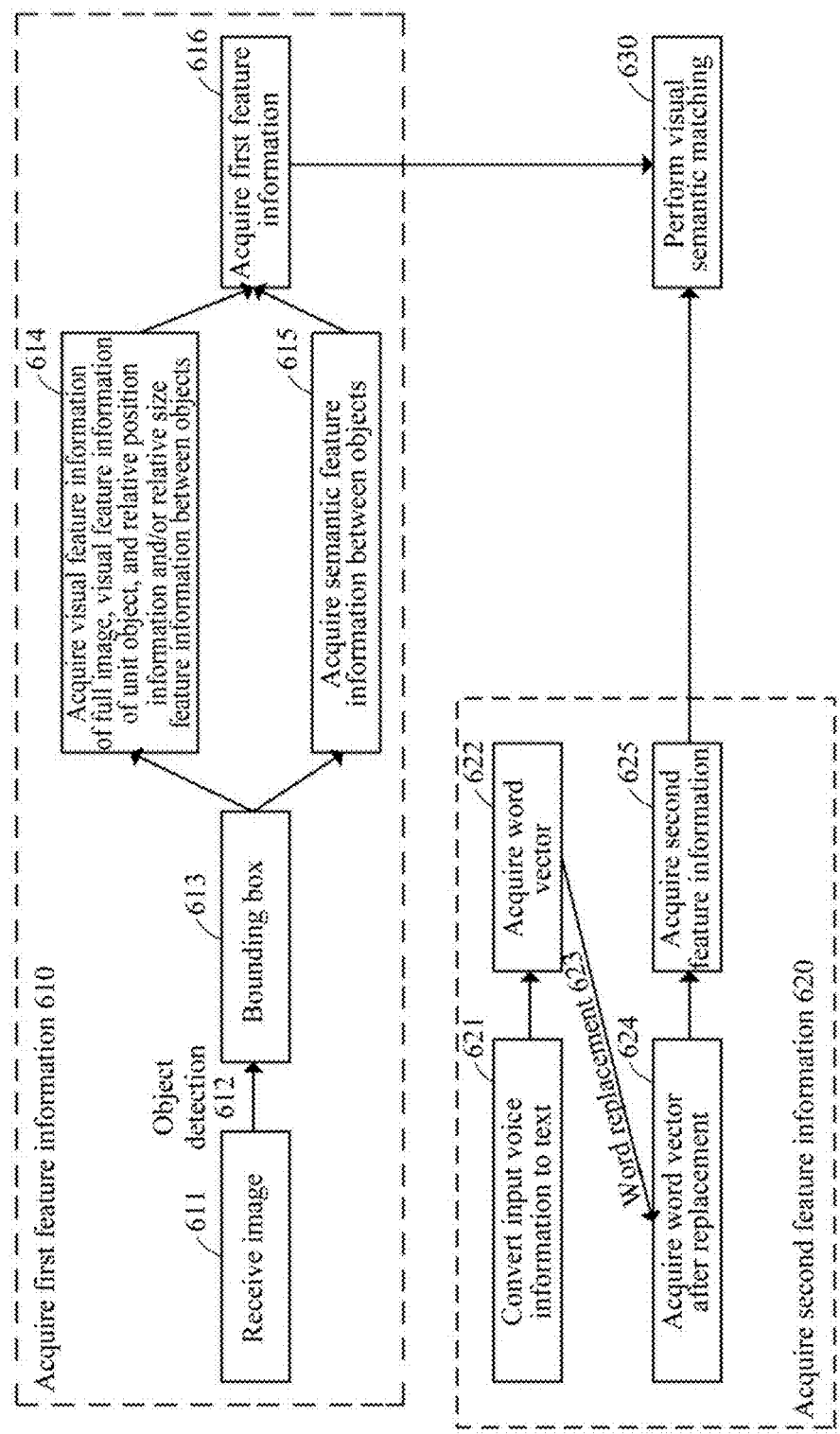
FIG. 6 illustrates an example of a method of determining a target object in an image based on an interactive input.

FIG. 6 illustrates another example of a method of determining a target object in an image based on an interactive input. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, and devices such as a processor, that perform the specified functions, or combinations of special purpose hardware and computer instructions. In addition to the description of FIG. 6 below, the descriptions of FIGS. 1A-5 are also applicable to FIG. 6 and are incorporated herein by reference. Thus, the above description may not be repeated here.

Referring to FIG. 6, the method of determining a target object in an image based on an interactive input includes operation 610 of acquiring first feature information, operation 620 of acquiring second feature information, and operation of matching the first feature information and the second feature information.

In operation 610, a device implementing the method of determining a target object receives an image or a single frame of a video in operation 611, detects an object in the image in operation 612, performs a visual feature extraction with respect to a bounding box of the detected object included in the image in operation 613. In operation 614, the method acquires visual feature information of a unit object, i.e., each object, visual feature information of a full image, and relative position information between objects included in the image, and/or relative size feature information between the objects included in the image. In operation 615, the method acquires semantic feature information between the objects, i.e., relative size feature information included in the sematic feature information.

In operation 616, the method of determining a target object acquires the first feature information by sequentially acquiring at least one of the visual feature information of the unit object, the visual feature information of the full image, the relative position information, the relative size feature information, and the semantic feature information and by performing a feature fusion processing of the acquired information. A process of acquiring the first feature information is described above with reference to FIGS. 3 and 5.

In operation 620, the device implementing the method of determining a target object converts input voice information to a text in operation 621, converts each word of an input phrase to a word vector in operation 622, determines whether an input word has a use frequency of less than a desired value and, when the input word is determined to have the use frequency of than the desired value, replaces the input word with a semantically similar word having a relatively high use frequency in operation 623, acquires a word vector having a relatively high use frequency with respect to each word of the entire input voice information in operation 624, and acquires second feature information, that is, a language feature by processing the entire input sentence in operation 625.

Here, operation 623 of replacing the word having the relatively low use frequency with the semantically similar word having the relatively high use frequency may represent retrieving a word vector of a word having a relatively high use frequency that has a cosine similarity of a desired value with a word vector of the word having the relatively low use frequency and replacing the word vector of the word having the relatively low use frequency with the retrieved word vector of the word having the relatively high use frequency.

Figure 7:
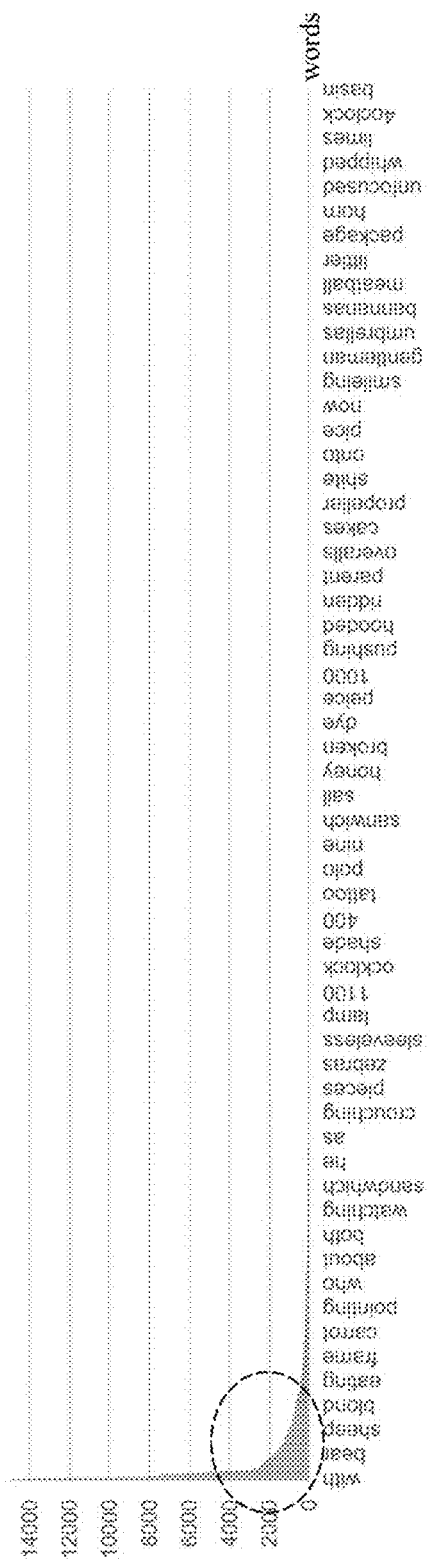
FIG. 7 is a graph illustrating an example of a distribution based on a use frequency of a word.

FIG. 7 is a graph showing an example of a distribution based on a use frequency of a word.

Referring to FIG. 7, when persons describe an object, the word use exhibits a very outstanding long-tail effect. Using RefCOCO+ data set as an example, the data set includes a total of 2627 different words. Here, words are indicated by a horizontal axis, but a coordinate point of each word is omitted. Referring to the graph, 10 words have a relatively most high frequency and have appeared 13000 times as an average. The words are intensively distributed around an origin, which is indicated with a dotted circle. More than half of words, for example, 1381 words have appeared less than 20 times. In the following example, a word having a use frequency less than a first setting value is defined as a first word and a word having a use frequency greater than a second setting value is defined as a second word.

Since the use frequency of the first word is relatively low, the quantity of samples becomes very unbalanced. Accordingly, when training a model, an LSTM model may not learn a relatively excellent feature expression of a corresponding word with respect to a sample having a significantly low appearance frequency. Therefore, it may affect extraction of second feature information, that is, a semantic feature, from the sentence. For example, with respect to a scene of a canoe that is included in an image, if a user asks a device for "canoe in the middle", the model may not make a sematic feature of the word correspond to a visual feature of a corresponding image region since the word "canoe" has a relatively small training set appearance frequency. Accordingly, the device may not understand the object designated by the user. If the canoe is replaced with a semantically similar word, for example, a small boat, having a relatively high appearance frequency, the device may understand the object designated by the user and may output an accurate result. The following Table 1 shows examples of word replacement.

TABLE 1

| existing word | refrigerator | totally | Puppy | grin | blackest | loaf | wallet |
|---|---|---|---|---|---|---|---|
| mapping word | fridge | completely | dog | smile | darkest | bread | purse |

In one example, second feature information, that is, a language feature may be extracted using a functional module, for example, a language identifier or an identifier, a word vector unit, a word determiner, a word replacer, and a feature extractor.

The voice identifier converts input voice information to a text. The word vector unit converts each word of an input phrase to a word vector and the word determiner determines whether the input word is a first word. When the input word is determined as the first word, the word replacer selects a second word semantically similar to the first word and replaces the first word with the selected second word. The feature extractor is a single LSTM language coder and completes coding of the entire sentence by sequentially input words one by one and acquires second feature information, that is, a language feature.

Here, after converting each word of the input phrase to a word vector using the word vector unit, the device commonly stores each word and a corresponding word vector and the word identifier uses not the word vector but the stored word to determine whether the word is the first word.

Using the aforementioned replacement method using a word semantically similar to a given word vector, a low frequency sample (using the first word having a relatively low appearance frequency) from which a relatively excellent feature is unextractable may be replaced with a high frequency sample (using the second word having a relatively high appearance frequency) from which a relatively excellent feature is extractable. Although the word replacement is performed, the meaning of an original sentence does not change. For example, when a phrase represented by the user is "black shirt with pinkish emblem", the phrase may be converted to "black shirt with reddish logo" through word replacement. Here, the meaning of the original input phrase is identical to that of the converted phrase.

The interactive input in the respective examples is not limited to a natural language input. For example, the interactive input may be a text directly input from the user in a character form.

Referring to FIG. 6, when extracting the first feature information, each of full information and/or same size feature information and language feature information between objects is acquired. In one example, it is possible to solve an issue that there is no high-level semantic feature including an object relationship and an issue that it is impossible to extract a relatively excellent language feature using a rare word having a relatively low use frequency or a word absent in a training set.

In one example, it is possible to extract a relatively excellent feature by applying a VRN to a single pair of objects included in an image and by identifying semantic feature information between two objects, that is, a relationship between objects. and to acquire a relatively excellent language feature by replacing a word having a relatively low use frequency with a semantically similar word having a relatively high use frequency. Accordingly, the human-machine interactive device may further accurately and quickly retrieve an object represented with a user language in an image.

In addition, in one example, since a first word having a relatively low use frequency is replaced with a second word having a relatively high use frequency, a human-machine interactive method may be implemented and may also be used alone.

In one example, each object bounding box is acquired by visually detecting an object in an input image. Visual feature information corresponding to each bounding box is acquired by extracting a bounding box of a current object of a specific layer and visual feature information of a full image using a basic network, for example, VGG-16, ResNet-101, etc., by using position and size information of the bounding box of the current object and relative position and relative size information between the bounding box of the current object and a bounding box of an object adjacent thereto as a separate feature and by concatenating the same to visual feature information. Here, VGG-16 and ResNet-101 represent a network for large image recognition in the related art.

If a first word of an interactive input is present without extracting semantic feature information between objects, the first word may be replaced with a second word. In this case, with respect to a simple human-machine interactive scene, the interactive input does not relate to a high-level semantic understanding scene and such deletion may be performed with respect to a device to reduce system cost and to make a system processing rate and processing accuracy balanced. Further detailed operations may refer to the aforementioned examples.

The examples may apply to various types of other human-machine interactive scenes. Object information in a scene described by a person using a language may play an important role in the human-machine interactive device. A user may select an object in the scene without using a hand. If another object corresponding to the same object type is present in the image, an object designated by the user may not be accurately determined using an image classification method and a separate confirmation/selection operation may be required, which may lead to degrading the performance of the human-machine interactive device. In one example, the aforementioned type issue may be solved and the above process may be performed quickly and accurately. When determining the target object based on the similarity, a specific type of a target may be detected based on a demand.

In one example, the method of determining a target object in an image may widely apply to an object designated by a user using an interactive input, for example, a voice input or a character input, which may include price, evaluation, translation, encyclopedia, and navigation. However, it is provided as an example only. The method may widely apply to a device, such as an augmented reality (AR) head up display device (HUD), AR glasses, security systems, and smart furniture.

For example, the user may request the device to translate characters above a billboard on the right of a mark XX from Korean to English in an image that includes a large number of billboards. Although a large number of billboards are included in a corresponding scene, the device may determine a target object designated by the user based on first feature information of the image, and may translate the billboard designated by the user using character recognition technology and machine translation technology.

As another example, the user may ask the device about a person having a shortest hair in the image. The device may determine a target object designated by the user and accordingly, may answer a question of the user by identifying a face of the determined target object using a human face recognition device.

As another example, the user may ask the device about price of shoes worn by a person jumping on the right. The device may determine a target object designated by the user based on first feature information of the image (including semantic feature information between objects, for example, jump) and may acquire price information of a corresponding product using technology for searching for an image using a shoe image of the target object.

Figure 8:
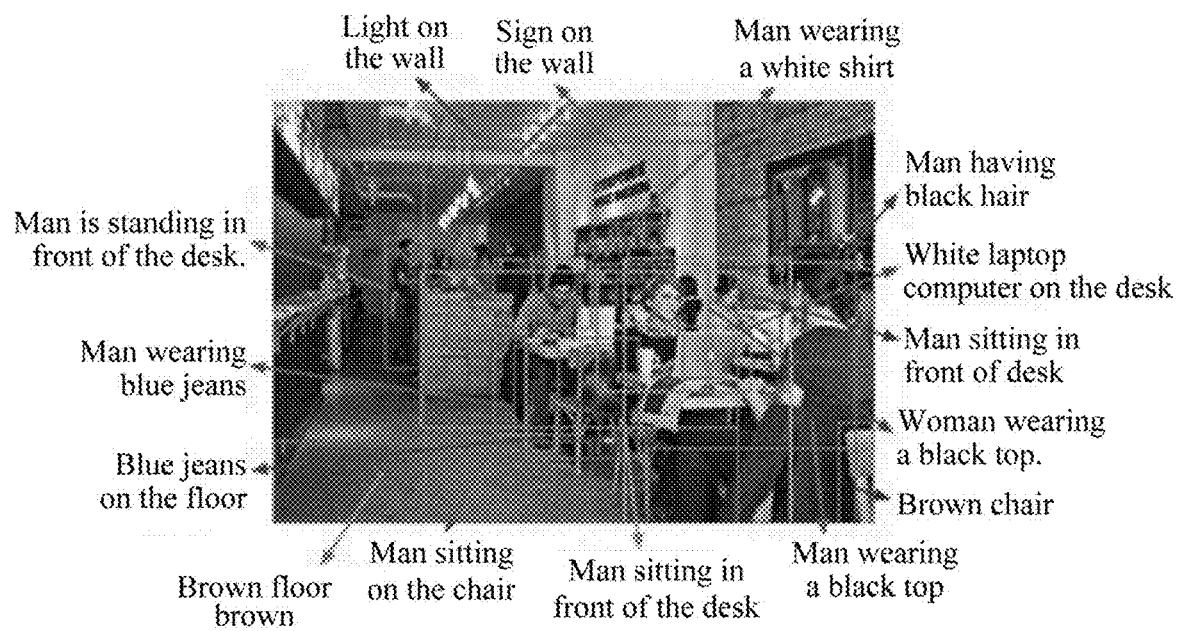
FIG. 8 illustrates an example of applying a method of determining a target object in an image based on an interactive input.

FIG. 8 illustrates an example of applying a method of determining a target object in an image based on an interactive input.

Referring to FIG. 8, information, such as, for example, a man wearing jeans, a white laptop computer on a desk, and a woman wearing a black shirt are identifiable in the image. That is, a device identifiable input is significantly enhanced.

In terms of a performance index, a trained system for determining a target object was operated in RefCOCO+ public data set and a test was performed. The corresponding data set includes over 17000 images and includes 42000 objects designated as proxy and 120000 object describing phrases. A performance test was performed with respect to a verification set of the corresponding data set, a test set A, and a test set B. Compared to an existing method through an algorithm comparison, the example shows a significant upgrade in other test sets. For example, the test set A shows a performance upgrade of 1.5% or more. Here, RefCOCO+ includes a data set that is generated by performing training using images collected according to the related art.

In an example, an apparatus for determining a target object in an image based on an interactive input is provided.

Figure 9:
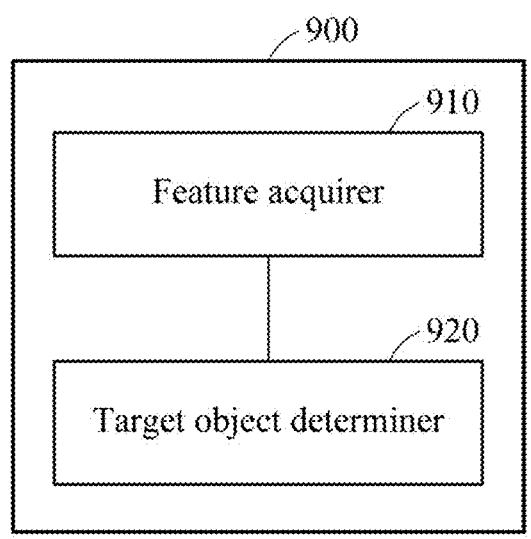
FIG. 9 illustrates an example of an apparatus for determining a target object in an image based on an interactive input.

FIG. 9 illustrates an example of an apparatus for determining a target object in an image based on an interactive input.

Referring to FIG. 9, an apparatus 900 for determining a target object in an image based on an interactive input includes a feature acquirer 910 and a target object determiner 920. The feature acquirer 910 acquires first feature information corresponding to an image and second feature information corresponding to an interactive input. The target object determiner 920 determines the target object corresponding to the interactive input among objects included in the image based on the first feature information and the second feature information. Further description related to operations of the feature acquirer 910 and the target object determiner 920 may refer to the aforementioned examples.

Figure 10:
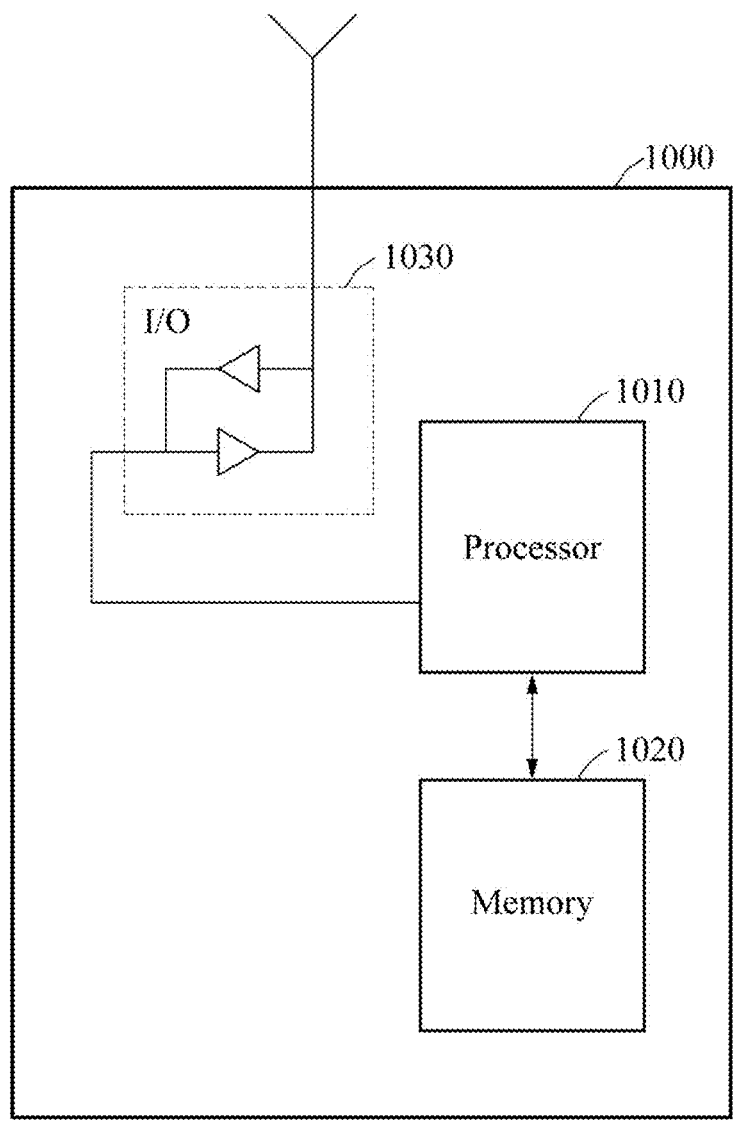
FIG. 10 illustrates an example of an apparatus for determining a target object in an image based on an interactive input.

FIG. 10 illustrates an example of an apparatus for determining a target object in an image based on an interactive input.

Referring to FIG. 10, an apparatus 1000 includes a processor 1010, for example, a digital signal processor (DSP). The processor 1010 may be a single apparatus or a plurality of apparatuses configured to execute a different operation depending on examples. Further details regarding the processor 1010 is provided below. The apparatus 1000 further includes an I/O device 1030 configured to receive a signal from another apparatus or person or to transmit a signal to the other apparatus or person.

In addition, the apparatus 1000 includes a memory 1020. The memory 1020 may be, for example, a nonvolatile memory or a volatile memory, for example, an electrically erasable and programmable read only memory (EEPROM) and a flash memory. In response to executing a corresponding computer-readable instruction using the processor 1000, the computer-readable instruction executes the method according to examples. Further details regarding the memory 1020 is provided below.

According to the examples described above, a target object is determined based on an interactive input by acquiring first feature information including semantic feature information between objects and by matching the first feature information and second feature information corresponding to the interactive input. Therefore, the capability of understanding a feature representation of an object designated by a user of a human-machine interactive device is enhanced, and the human-machine interactive device determines a target object further accurately and quickly. Also, the adaptive capability of the human-machine interactive device with respect to a word having a relatively low use frequency is enhanced by mapping a relatively rare word, for example, a word having a relatively low use frequency and a relatively frequent word, for example, a word having a relatively high use frequency. Therefore, the human-machine interactive device determines the target object further accurately and quickly.

The apparatus 900 for determining a target object in an image, the feature acquirer 910, the target object determiner 920, and other apparatuses and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of determining a target object in an image based on an interactive input. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   acquiring first feature information corresponding to an image, including
      detecting a plurality of objects in the image, and
      extracting feature information with respect to a region having plural objects determined among the detected plurality of objects;
   acquiring second feature information corresponding to an interactive input; and
   determining a target object corresponding to the interactive input from among multiple objects, of the plurality of objects, in the image based on the first feature information and the second feature information.

2. The method of claim 1, wherein the acquiring of the first feature information comprises:
   acquiring semantic feature information between each of the multiple objects and at least one other object of the plurality of objects.

3. The method of claim 2, wherein the acquiring of the semantic feature information comprises:
   acquiring the semantic feature information between each of the multiple objects and the at least one other object based on position information of each of the multiple objects.

4. The method of claim 2, wherein the acquiring of the semantic feature information comprises:
   determining at least one region proposal based on each of the multiple objects and the at least one other object;
   acquiring classification feature information of an object in the region proposal; and
   acquiring region semantic feature information between corresponding objects in the region proposal; and
   generating the semantic feature information between each of the multiple objects and the at least one other object based on the classification feature information and the region semantic feature information.

5. The method of claim 4, prior to the generating of the semantic feature information, further comprising:
   performing a joint correction with respect to the classification feature information and the region semantic feature information based on the classification feature information and the region semantic feature information.

6. The method of claim 4, prior to the generating of the semantic feature information, further comprising:
   determining a reference region based on the region proposal;
   acquiring region feature information of the reference region; and
   performing a joint correction with respect to the classification feature information, the region semantic feature information, and the region feature information based on the classification feature information, the region semantic feature information, and the region feature information.

7. The method of claim 4, wherein the region proposal comprises one of the multiple objects and the other object.

8. The method of claim 1, wherein the first feature information comprises at least one of global visual feature information corresponding to the image, visual feature information corresponding to each of the multiple objects, relative position information between the multiple objects, relative size feature information between the multiple objects, and semantic feature information between the multiple objects.

9. The method of claim 8, wherein the determining of the target object comprises:
   performing a fusion processing on the first feature information prior to determining the target object.

10. The method of claim 1, further comprising:
    acquiring training data comprising a sample training image;
    determining at least one region proposal based on each of training objects included in the training sample image and at least one other training object included in the sample training image;
    determining a reference region based on the at least one region proposal and acquiring region feature information of the reference region;
    generating a region title based on the region feature information; and
    training a neural network model for acquiring semantic feature information between the training objects based on training data supervised with the region title.

11. The method of claim 1, wherein the acquiring of the second feature information comprises:
    performing a word vector conversion with respect to the interactive input; and
    acquiring the second feature information corresponding to the interactive input based on a word vector.

12. The method of claim 11, wherein the acquiring of the second feature information further comprises determining whether a word of the interactive input belongs to a first word prior to performing the word vector conversion with respect to the interactive input, and
    the performing of the word vector conversion comprises using a word vector of a second word having a relatively high similarity with a word vector of the first word as a word vector corresponding to the first word, in response to the word of the interactive input being determined to belong to the first word.

13. The method of claim 12, wherein the first word represents a word having a use frequency less than a first setting value, and
    the second word represents a word having a use frequency greater than a second setting value.

14. The method of claim 1, wherein the interactive input comprises at least one of a voice input or a text input.

15. A non-transitory computer-readable recording medium storing instructions, that when executed by a processor, causes the processor to perform the method of claim 1.

16. An apparatus, the apparatus comprising:
    a processor configured to:
       acquire first feature information corresponding to an image, including
          a detection of a plurality of objects in the image, and
          an extraction of feature information with respect to a region having plural objects determined among the detected plurality of objects;
       acquire second feature information corresponding to an interactive input; and
       determine a target object corresponding to the interactive input from among multiple objects, of the plurality of objects, based on the first feature information and the second feature information.

17. An apparatus, the apparatus comprising:
    a processor configured to:
       acquire first feature information corresponding to an image and second feature information corresponding to an interactive input; and determine a target object corresponding to the interactive input from among objects included in the image based on the first feature information and the second feature information, wherein the first feature information comprises at least one of global visual feature information corresponding to the image, visual feature information corresponding to each of the objects included in the image, relative position information between the objects included in the image, relative size feature information between the objects included in the image, or semantic feature information between the objects included in the image.

18. The apparatus of claim 16, wherein, for the acquiring of the first feature information, the processor is configured to:
   determine at least one region proposal based on each of the multiple objects and at least one other object;
   acquire classification feature information of an object in the region proposal;
   acquire region semantic feature information between corresponding objects in the region proposal;
   determine a reference region based on the region proposal;
   acquire region feature information of the reference region;
   perform a joint correction with respect to the classification feature information, the region semantic feature information, and the region feature information based on the classification feature information, the region semantic feature information, and the region feature information; and
   generate semantic feature information, of the first feature information, between each of the multiple objects and the at least one other object based on the corrected classification feature information, the corrected region semantic feature information, and the corrected region feature information.

19. An apparatus, the apparatus comprising:
   a processor configured to:
      acquire first feature information corresponding to an image and second feature information corresponding to an interactive input; and
      determine a target object corresponding to the interactive input from among objects included in the image based on the first feature information and the second feature information,
   wherein, for the acquiring of the second information, the processor is configured to:
      perform a word vector conversion with respect to the interactive input; and
      acquire the second feature information corresponding to the interactive input based on a word vector.

20. The apparatus of claim 19, wherein, for the acquiring of the second information, the processor is further configured to:
   determine whether a word of the interactive input belongs to a first word when performing the word vector conversion with respect to the interactive input; and
   use a word vector of a second word having a relatively high similarity with a word vector of the first word as a word vector corresponding to the first word, in response to the word of the interactive input being determined to belong to the first word,
   wherein the first word represents a word having a use frequency less than a first setting value, and the second word represents a word having a use frequency greater than a second setting value.

21. The apparatus of claim 16, where the acquiring of the first feature information includes determining semantic relationships between the multiple objects.

22. The apparatus of claim 16, wherein, for the acquiring of the second information, the processor is configured to perform a word vector conversion with respect to the interactive input, and acquire the second feature information corresponding to the interactive input based on a word vector.

23. The apparatus of claim 22, wherein, for the acquiring of the second information, the processor is further configured to:
   determine whether a word of the interactive input belongs to a first word when performing the word vector conversion with respect to the interactive input; and
   use a word vector of a second word having a relatively high similarity with a word vector of the first word as a word vector corresponding to the first word, in response to the word of the interactive input being determined to belong to the first word.

24. The apparatus of claim 23, wherein the first word represents a word having a use frequency less than a first setting value, and
   the second word represents a word having a use frequency greater than a second setting value.

25. The apparatus of claim 16, wherein the first feature information comprises semantic feature information between the multiple objects and at least one of global visual feature information corresponding to the image, visual feature information corresponding to each of the objects included in the image, relative position information between the objects included in the image, relative size feature information between the objects included in the image.

* * * * *